Nov. 20, 1951 — T. BROWN — 2,575,510
CULTIVATOR SPRING TRIP
Filed Feb. 9, 1946
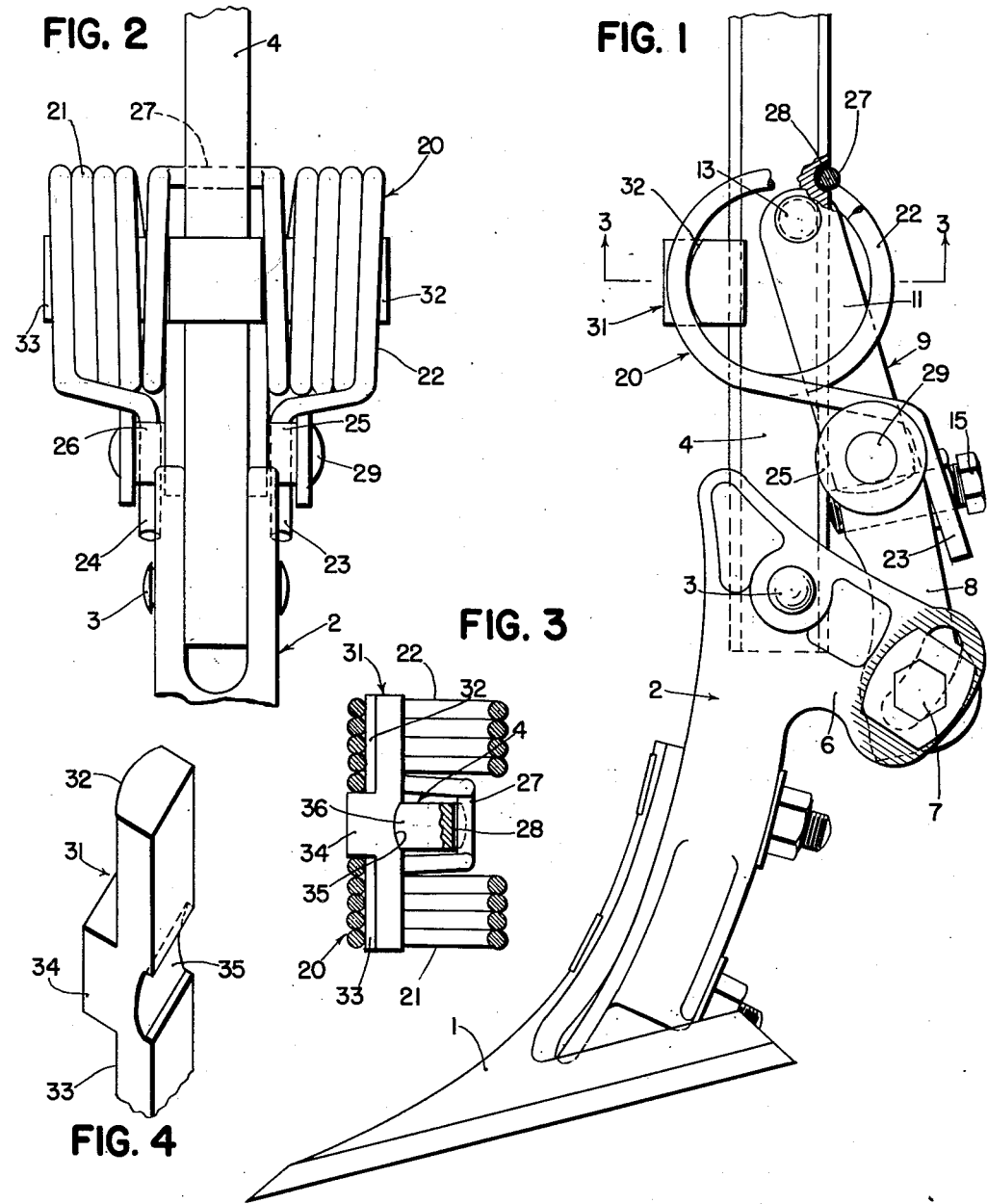
INVENTOR
THEOPHILUS BROWN Patented Nov. 20, 1951

2,575,510

UNITED STATES PATENT OFFICE 2,575,510

CULTIVATOR SPRING TRIP

Theophilus Brown, Moline, Ill., assignor to Deere & Company, Moline, Ill., a corporation of Illinois Application February 9, 1946, Serial No. 646,597

1 Claim. (Cl. 97—184)

The present invention relates generally to agricultural implements and more particularly to agricultural machines having ground engaging and/or working tools.

The object and general nature of the present invention is the provision of a new and improved spring trip device, especially adapted for tractor mounted cultivators and the like, in which provision is made for rearward displacement of the ground engaging tools if they should strike an obstruction, thus preventing damage to or breakage of any of the associated parts. More specifically, it is a feature of this invention to provide a cultivator spring trip which is especially compact, easy to assemble, and economical to manufacture and service. Further, it is an additional feature of this invention to provide a cultivator spring trip or like device in which there are no overhanging parts and in which space requirements are quite small.

A further feature of this invention is the provision of a spring trip of the toggle type having a double coil spring arranged to hold the toggle in operative position, with the coils of the spring disposed on opposite sides of and generally close to the shank or standard, and with an intermediate portion of the spring bearing against one side of and lying in a notch in the shank or standard while the coils of the spring are received by and react against a transverse bar seated against the opposite side of the shank or standard.

These and other objects and advantages of the present invention will be apparent to those skilled in the art after a consideration of the following detailed description, taken in conjunction with the accompanying drawings, in which:

Figure 1 is a side view of a cultivator spring trip in which the principles of the present invention have been incorporated.

Figure 2 is a fragmentary front view of the device shown in Figure 1.

Figure 3 is a sectional view taken generally along the line 3—3 of Figure 1.

Figure 4 is a perspective view of the anchoring bar supporting the double coil spring which normally maintains the tool holding toggle in operative position.

Referring now to the drawings, particularly Figure 1, in order to illustrate the principles of the present invention I have shown the same as incorporated in a spring trip device for a cultivator shovel. As shown in Figure 1, the cultivator shovel is indicated by the reference numeral 1 and is shown as mounted on a foot piece 2 which is pivoted at 3 on the lower end of a shank or standard 4. The upper end of the shank or standard 4 is clamped to the cultivator or other implement by any suitable means and which it is not necessary to describe here. The foot piece 2 includes a rear extension 6 which carries an adjustable pivot 7 receiving the lower member 8 of a toggle linkage 9, which also includes an upper link made up of a pair of straps 11. The upper ends of the straps 11 are pivoted, as at 13, to the shank or standard 4. An adjusting screw 15 is provided for setting the toggle links 8 and 11 in the desired angular relation to trip at the desired overload.

A double coil spring 20 is provided for yieldably and resiliently holding the toggle linkage 9 in extended or operative relation. As best shown in Figures 2 and 3, the double coil spring member 20 includes spaced apart coils 21 and 22 terminating, respectively, in ends 23 and 24 which bear against abutments in the form of shouldered collars 25 and 26 which are carried by a rivet 29 that forms the pivotal connection between the toggle links 8 and 11. The two coils 21 and 22 are joined by an intermediate portion of the spring indicated by the reference numeral 27. This portion 27 of the spring 20 embraces the shank or standard 4 and seats in a notch 28 (Figure 1) so that when the spring 20 is in position the spring is prevented from slipping upwardly or downwardly along the rear edge of the shank or standard 4.

At the forward side of the shank or standard 4 there is a cross bar 31 which is formed with two rounded sections 32 and 33 for receiving the coils 21 and 22 of the spring 20, and the sections 32 and 33 are separated by a central shouldered portion 34 so that the coils of the spring 20, when they bear against the bar 31, prevent the latter from being displaced laterally of the shank or standard 4. Also, and for the same purpose, the central portion of the bar 31 is provided with a notch 35 which seats against the forward edge 36 of the shank or standard 4, the latter serving as a support for the tool 1.

The assembly of the spring biasing means is a relatively simple matter. After the tool and toggle links are mounted on the shank, the spring 20 is brought into position with the intermediate portion 27 seated in the notch 28. Next the bar 31 is brought into position, and then with the use of suitable auxiliary tools engaging the ends 23 and 24 of the spring coils, the ends may readily be brought around the shouldered sleeves 25 and 26 and snapped into position therein. Such auxiliary tools may take the form of pipes that can readily be slipped over the ends 23 and 24. It will be noted from Figure 1 that the end portions 23 and 24 of the spring coils are spaced from the sleeves or collars 25 and 26 so as to provide access and space for the procedure just described. Other means may, of course, be provided for the easy and quick assembly of the parts.

In operation, if the tool 1 (Figure 1) should be subjected to an abnormal load, as by striking an obstruction, the toggle linkage 9 breaks upwardly, carrying the pivot 29 upwardly and to the right, as viewed in Figure 1, moving against the force exerted by the coil spring member 20. As the end sections 23 are displaced upwardly and rearwardly, the coils 21 and 22 are tightened and at the same time they are shifted a slight distance upwardly, this being permitted by the fact that the bar 31 slides upwardly a slight distance along the forward edge of the standard 4 from the position shown in Figure 1, yet the spring member 20 is held in position at all times by the fact that the intermediate section 27 rests in the notch in the rear end of the standard or shank 4.

While I have shown and described above the preferred structure in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

For use in a cultivator or the like including a standard, a tool movably connected therewith, and a pair of pivotally interconnected toggle links connected between said standard and said tool, the improvements comprising a generally U-shaped spring member having a central standard-engaging portion adapted to engage one edge of said standard, and side portions, each including a coil spring section and each of said coil spring sections comprising a plurality of equal diameter turns, the laterally inward turn of which is connected to said standard-engaging portion and the laterally outermost turn of which terminates in a laterally inwardly bent portion the extremity of which is shaped to form an end lying in a plane substantially coinciding with the plane of the laterally inward turn of the associated coil section, the ends of said side portions extending substantially in parallelism, a pair of abutments carried at opposite sides of one of said toggle links, said generally parallel spring ends lying against the sides, respectively, of and slidable across said abutments, the latter comprising shouldered parts arranged on said link with the shoulders disposed laterally outwardly thereof distances sufficient to slidably receive said spring ends, respectively, and to hold said ends from becoming disengaged from said abutments in a laterally outward direction, and a cross bar adapted to engage the other side of said standard and having parallel end portions receiving said coil spring sections, respectively, and a central shouldered portion lying between and substantially in contact with the inward turns of said coil sections.

THEOPHILUS BROWN.

REFERENCES CITED

The following references are of record in the file of this patent:

UNITED STATES PATENTS

| Number | Name | Date |
|---|---|---|
| 598,057 | Ovenshire | Jan. 25, 1898 |
| 895,587 | Putney | Aug. 11, 1908 |
| 1,834,883 | Welikes | Dec. 1, 1931 |
| 2,364,303 | Martin | Dec. 5, 1944 |